(12) United States Patent
Chen et al.

(10) Patent No.: US 9,072,395 B2
(45) Date of Patent: Jul. 7, 2015

(54) SPOUT INTERLOCKING DEVICE OF A TEAPOT

(71) Applicant: Kuo-Chang Chen, Tainan (TW)

(72) Inventors: Kuo-Chang Chen, Tainan (TW);
Hsin-Huang Tsai, Tainan (TW);
Ying-Shan Wang, Tainan (TW)

(73) Assignee: Kuo-Chang Chen, Tainan (TW)

( * ) Notice: Subject to any disclaimer, the term of this patent is extended or adjusted under 35 U.S.C. 154(b) by 158 days.

(21) Appl. No.: 14/019,927

(22) Filed: Sep. 6, 2013

(65) Prior Publication Data

US 2015/0069093 A1    Mar. 12, 2015

(51) Int. Cl.
*B65D 83/60* (2006.01)
*A47G 19/14* (2006.01)
*B65D 47/06* (2006.01)

(52) U.S. Cl.
CPC ............... *A47G 19/14* (2013.01); *B65D 47/06* (2013.01)

(58) Field of Classification Search
CPC .................. B65D 47/08; B65D 2251/1066

USPC .......... 220/263–264, 753, 756; 222/466, 469, 222/472, 474, 475.1
See application file for complete search history.

(56) References Cited

U.S. PATENT DOCUMENTS

| 1,380,302 | A | * | 5/1921 | Moe ............................... 222/469 |
| 1,559,904 | A | * | 11/1925 | Moore ........................... 222/467 |
| 1,728,354 | A | * | 9/1929 | Martin ....................... 222/465.1 |
| 5,135,128 | A | * | 8/1992 | Kuhn ........................... 220/318 |

* cited by examiner

*Primary Examiner* — Paul R Durand
*Assistant Examiner* — Andrew P Bainbridge
(74) *Attorney, Agent, or Firm* — WPAT, P.C.; Anthony King

(57) ABSTRACT

A spout interlocking device of a teapot has a first fixing module, a handle module, and a spout cover module. The first fixing module has a first positioning base, and a first base cover covering a top of the first positioning base. The handle module is pivotably mounted on the first positioning base and has a first handle, a second handle, and an interlocking unit. The first handle and the second handle are mounted in the first positioning base. The interlocking unit is mounted on the front ends of the first handle and the second handle and is pivotably mounted in the first positioning base. The spout cover module is mounted on the first positioning base and has a pivot portion pivotably mounted in the first positioning base and a cover body connected with the pivot portion.

20 Claims, 7 Drawing Sheets

SPOUT INTERLOCKING DEVICE OF A TEAPOT

BACKGROUND OF THE INVENTION

1. Field of the Invention

The present invention relates to a spout device, and more particularly to a spout interlocking device of a teapot.

2. Description of Related Art

A teapot has a body, a spout, and a lid. The lid covers an opening of the body to prevent dirt from falling into the body. However, the spout communicates with the exterior environment directly, such that dirt still falls into the body from the spout.

An improved teapot is provided to further have a spout cover pivotably mounted on the spout to selectively cover the spout. When the user wants to drink from the teapot, the spout cover is pivoted relative to the spout, such that the user can incline the teapot to pour out the drinks in the teapot. When not pivoted, the spout cover shelters the spout to prevent dirt from falling into the body from the spout.

However, when the teapot is inclined, the spout cover cannot be opened with ease due to the gravity. The drinks poured out of the body may be spilled along the periphery of the spout cover. A further improved teapot is provided to further have a tab mounted on the spout cover. When the teapot is inclined, the body is held by its handle by the user, and the tab is pressed by the thumb of the user in the meantime. Therefore, the spout cover can remain opened against the gravity.

Nevertheless, when the conventional improved teapot is in use, the body is lifted and inclined gradually by the wrist of the user, while the tab is pressed by the thumb of the user, and such a process is not a smooth one. On the other hand, the teapot may be quite heavy when filled with drink, and the wrist of the user may be twisted easily. Consequently, many users choose not to press the spout tab at all since the operation process cannot be done with ease. As a result, the user still has to pay deliberate attention to prevent the drink poured from the spout from spilling along the periphery of the spout cover.

SUMMARY OF THE INVENTION

The main objective of the present invention is to provide a spout interlocking device of a teapot to resolve the problems of the conventional teapots.

The spout interlocking device of a teapot has a first fixing module, a handle module, and a spout cover module.

The first fixing module has a first positioning base, and a first base cover covering a top of the first positioning base.

The handle module is pivotably mounted on the first positioning base and has a first handle, a second handle, and an interlocking unit. The first handle is elongated and is pivotably connected with the first positioning base. The second handle is elongated and is pivotably connected with the first positioning base. The interlocking unit is mounted on a front end of the first handle and a front end of the second handle, is located in and pivotably mounted in the first positioning base, and is covered and positioned by the first base cover.

The spout cover module is mounted on the first positioning base and has a spout cover mounted on the first positioning base and having a pivot portion and a cover body. The pivot portion is pivotably mounted in the first positioning base, extends opposite to the handle module, is located under the interlocking unit, and is selectively abutted by the interlocking unit. The cover body is connected with the pivot portion at a position opposite to the first positioning base.

Other objectives, advantages and novel features of the present invention will become more apparent from the following detailed description when taken in conjunction with the accompanying drawings.

DETAILED DESCRIPTION OF PREFERRED EMBODIMENT

Figure 1:
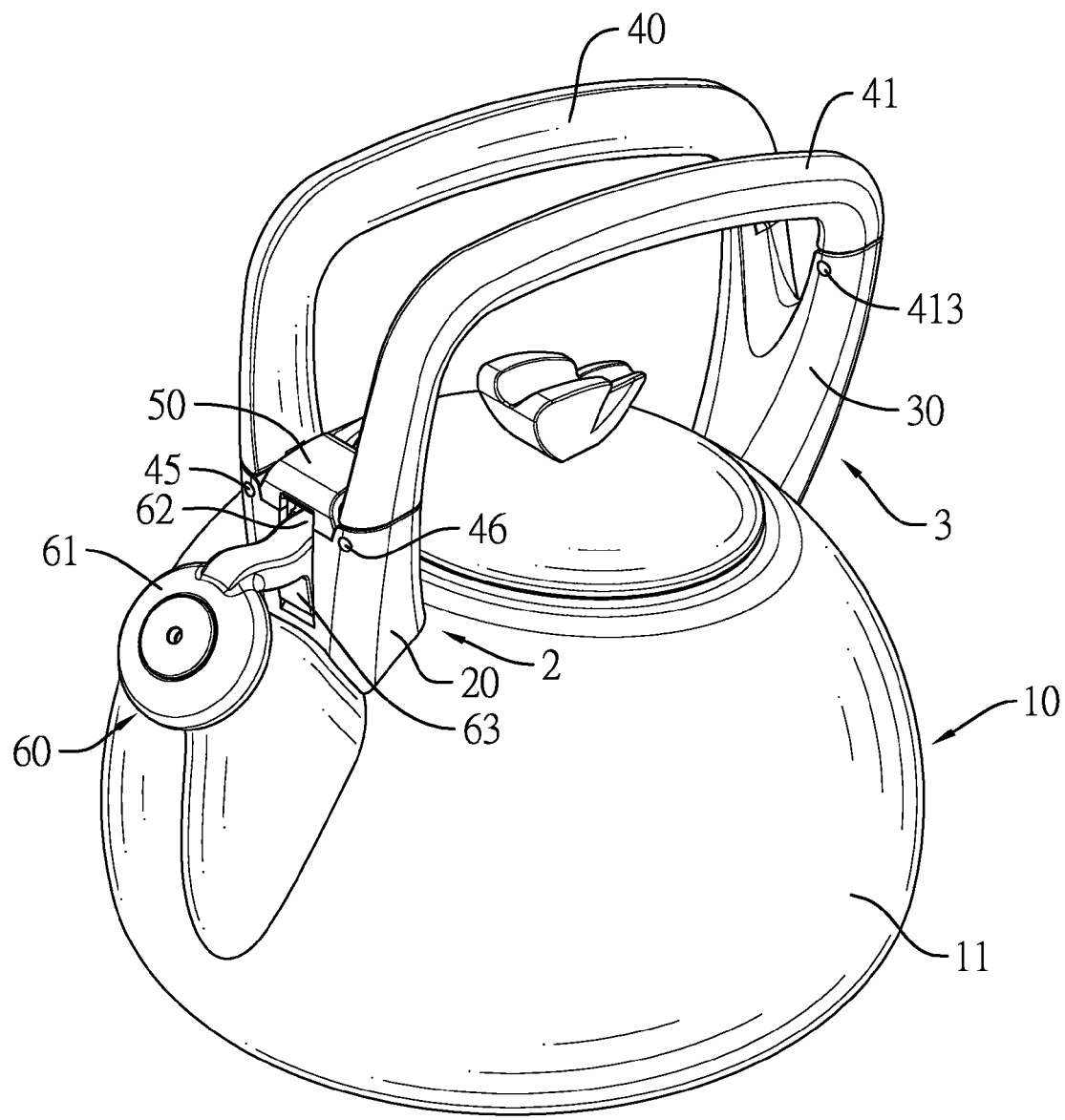
FIG. 1 is a perspective view of a first preferred embodiment of a spout interlocking device of a teapot in accordance with the present invention.
Figure 2:
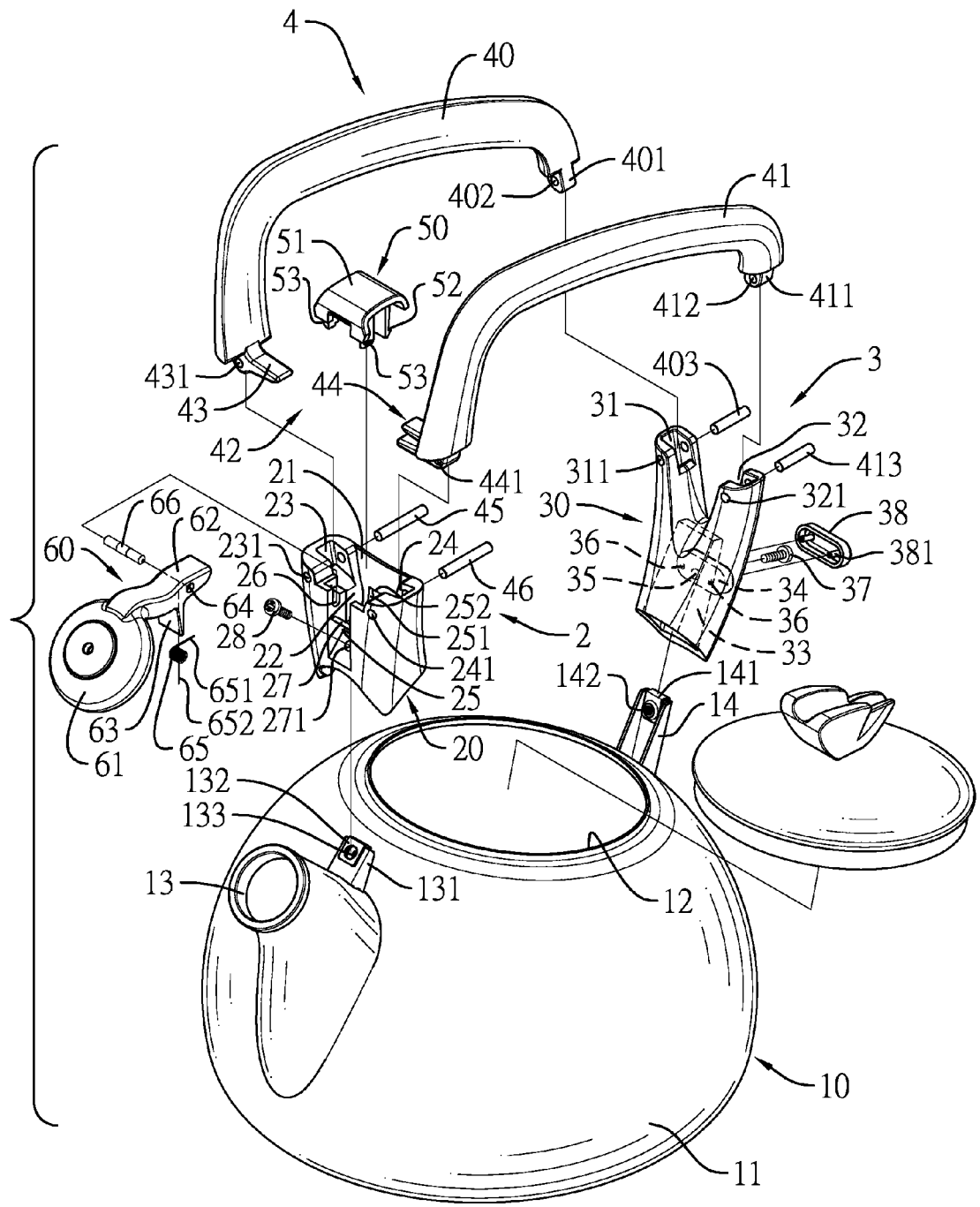
FIG. 2 is an exploded perspective view of the spout interlocking device in FIG. 1.

With reference to FIGS. 1 and 2, a first preferred embodiment of a spout interlocking device of a teapot in accordance with the present invention is mounted on a teapot 10. The teapot 10 has a body 11, a teapot opening 12, a spout 13, a first spout positioning plate 131, an enhancing plate 132, a first screw hole 133, and a second spout positioning plate 14.

The teapot opening 12 is formed through a top of the body 11 and communicates with an interior space formed in the body 11. The spout 13 is mounted on a front side of the body 11 and communicates with the interior space of the body 11. The first spout positioning plate 131 is mounted on the front side of the body 11 and is located at a top of the spout 13. The enhancing plate 132 is clamped by the first spout positioning plate 131. The first screw hole 133 is formed through the enhancing plate 132. The second spout positioning plate 14 is mounted on a rear side of the body 11 and has an inserting plate 141 and a second screw hole 142. The inserting plate 141 is located at the top of the second spout positioning plate 14. The second screw hole 142 is formed through the inserting plate 141.

Figure 3:
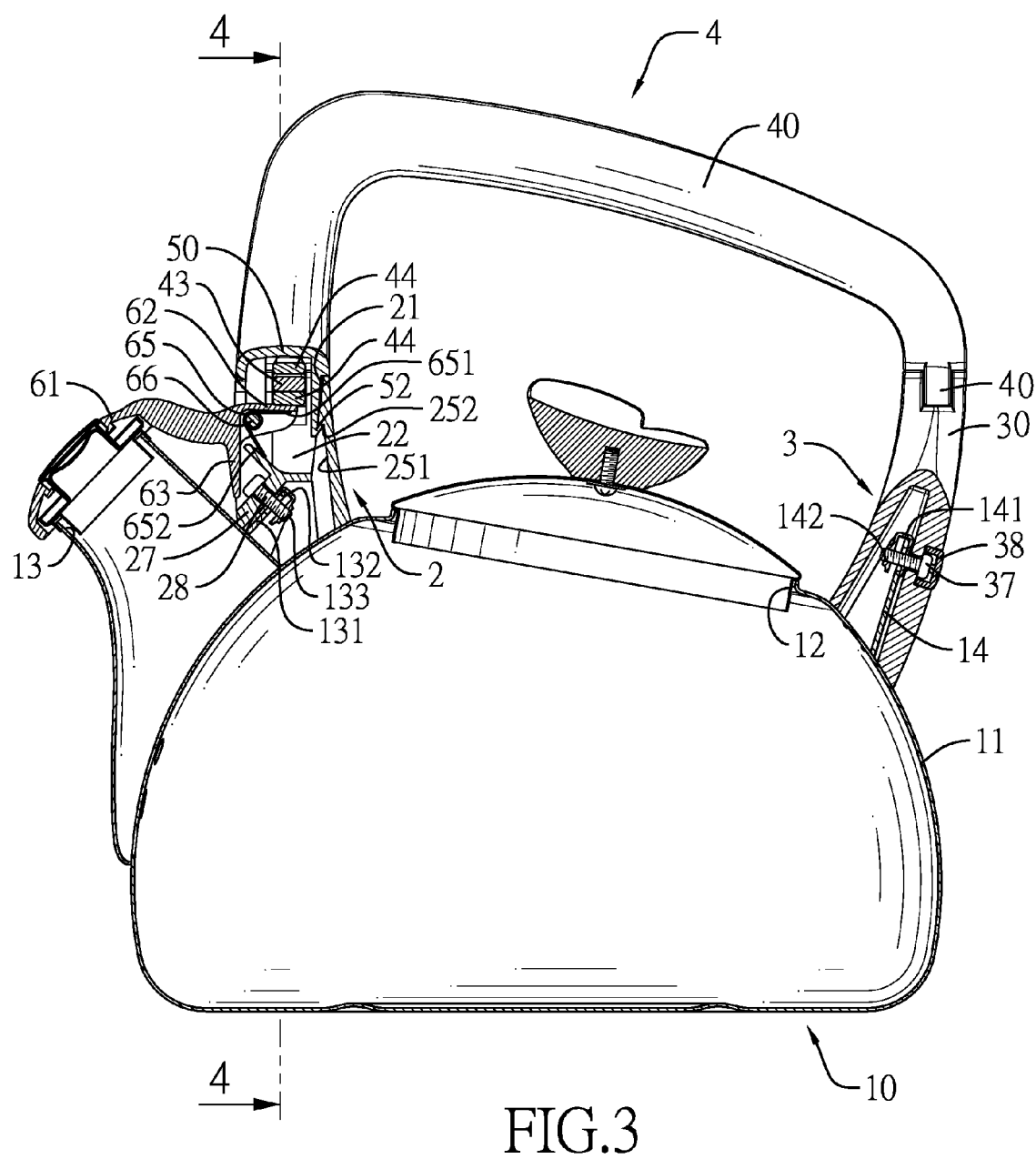
FIG. 3 is a side view in partial section of the spout interlocking device in FIG. 1.

With reference to FIGS. 1 to 3, the spout interlocking device of a teapot has a first fixing module 2, a second fixing module 3, a handle module 4, and a spout cover module 6. The first fixing module 2 is mounted on the body 11 and has a first positioning base 20 and a first fixing bolt 28. The first positioning base 20 is mounted on the body 11, covers the first spout positioning plate 131, extends upward, and has a first base trough 22, two working troughs 23, 24, a second base trough 25, an engaging trough 251, an engaging edge 252, two pin slits 26, and a front block 27.

The first base trough 22 is formed through the first positioning base 20 longitudinally, accommodates the first spout positioning plate 131, and has a base opening 21 formed in the top of the first positioning base 20. The working troughs 23, 24 are formed in the inner wall of the first positioning base 20, communicate with the first base trough 22, are aligned with each other, and are located at the top of the first positioning base 20. The working trough 23 has a working trough hole 231, and the working trough 24 has a working trough hole 241. The working trough holes 231, 241 are transversely formed through the first positioning base 20 and respectively communicate with the working troughs 23, 24. The second base trough 25 is formed in the front side of the first positioning base 20 and communicates with the first base trough 22, wherein the front side of the first positioning base 20 faces the spout 13. The engaging trough 251 is formed in the inner wall of the first positioning base 20 and opposite to the second base trough 25. The engaging edge 252 is formed on the top of the engaging trough 251. The pin slits 26 are formed in the inner wall of the first positioning base 20, are aligned with each other, and are located at the top of the second base trough 25. The front block 27 is mounted in the second base trough 25 and has a block hole 271 formed through the front block 27 and aligned with the first screw hole 133. The first fixing bolt 28 is inserted into the block hole 271 and then into the first screw hole 133 to fix the first positioning base 20 on the teapot 10.

The second fixing module 3 is mounted on the body 11 and has a second positioning base 30, a second fixing bolt 37, and a second base cover 38. The second positioning base 30 is Y-shaped, is mounted on the body 11, covers the second spout positioning plate 14, extends upward, and has two fixing troughs 31, 32, an insertion space 33, a recess 34, a positioning hole 35, and two insertion holes 36. The fixing troughs 31, 32 are formed in the top of the second positioning base 30, are formed in the inner wall of the second positioning base 30, and are respectively located at two opposite positions in the second positioning base 30. The fixing trough 31 has a fixing trough hole 311, and the fixing trough 32 has a fixing trough hole 321. The fixing trough holes 311, 312 are formed through the second positioning base 30 and respectively communicate with the fixing troughs 31, 32. The insertion space 33 is formed in the bottom of the second positioning base 30, is formed in the second positioning base 30 longitudinally, and communicates with the second spout positioning plate 14. The recess 34 is formed in the rear side of the second positioning base 30. The positioning hole 35 is formed in a bottom of the recess 34, communicates with the insertion space 33, and is aligned with the second screw hole 142. The insertion holes 36 are formed in the bottom of the recess 34. The second fixing bolt 37 is inserted into the positioning hole 35 and then into the second screw hole 142 to fix the second positioning base 30 on the teapot 10. The second base cover 38 covers the recess 34 and has two engaging pins 381 inserted into the insertion holes 36 respectively.

The handle module 4 is mounted on the body 11 and has a first handle 40, a second handle 41, two rear handle pins 403, 413, an interlocking unit 42, and two front handle pins 45, 46. The first handle 40 and the second handle 41 are both elongated, and are pivotably connected with the first positioning base 20 and the second positioning base 30 respectively. The first handle 40 has a first protruding base 401 and a first protruding base hole 402. The first protruding base 401 is formed on the rear end of the first handle 40 and is inserted into the fixing trough 31. The first protruding base hole 402 is formed through the first protruding base 401 and is aligned with the fixing trough hole 311. The second handle 41 has a second protruding base 411 and a second protruding base hole 412. The second protruding base 411 is formed on the rear end of the second handle 41 and is inserted into the fixing trough 32. The second protruding base hole 412 is formed through the second protruding base 411 and is aligned with the fixing trough hole 321. The rear handle pin 403 is inserted through the first protruding base hole 402 and the fixing trough hole 311. The rear handle pin 413 is inserted through the second protruding base hole 412 and the fixing trough hole 321. Therefore, the rear ends of the first handle 40 and the second handle 41 can be pivoted relative to the second positioning base 30.

The interlocking unit 42 is mounted on the front ends of the first handle 40 and the second handle 41 and is pivotably connected to the first positioning base 20. The interlocking unit 42 has a pushing block 43 and a positioning block 44. The pushing block 43 is mounted on the front end of the first handle 40 and in the working trough 23 and is a single tab protruding toward the second handle 41. The positioning block 44 is mounted on the front end of the second handle 41 and in the working trough 24 and is a double tab protruding toward the first handle 40, wherein the pushing block 43 (single tab) is inserted into the positioning block 44 (double tab) to form the interlocking unit 42. The pushing block 43 has a pushing block hole 431 formed through the pushing block 43 and aligned with the working trough hole 231. The positioning block 44 has a positioning block hole 441 formed through the positioning block 44 and aligned with the working trough hole 241. Alternatively, the pushing block 43 may be mounted on the second handle 41, and the positioning block 44 may be mounted on the first handle 40. The front handle pin 45 is inserted through the working trough hole 231 and the pushing block hole 431. The front handle pin 46 is inserted through the positioning block hole 441 and the working trough hole 241. Therefore, the front ends of the first handle 40 and the second handle 41 can be pivoted relative to the first positioning base 20.

Alternatively, the second fixing module 3 may be omitted, such that the first handle 40 and the second handle 41 are pivotably connected to the first positioning base 20 only.

The first fixing module 2 further has a first base cover 50 mounted on the first positioning base 20. The first base cover 50 has a top cap 51, an engaging hook 52 and two blocking plates 53. The top cap 51 is curved and covers the base opening 21. The engaging hook 52 is formed on and protrudes from the bottom of the top cap 51, extends downward, and is engaged with the engaging edge 252. The blocking plates 53 are formed on and protrude from the bottom of the top cap 51, extend downward, and are located at the front side of the first positioning base 20.

The spout cover module 6 is mounted on the spout 13 and the first positioning base 20. The spout cover module 6 has a spout cover 60, a spout cover pin 66, and a torsion spring 65. The spout cover 60 is mounted on the spout 13 and the first positioning base 20 and has a cover body 61, a pivot portion 62, a spout cover blocking plate 63, and a pivot portion hole 64. The cover body 61 covers the spout 13. The pivot portion 62 extends from the rear side of the cover body 61, is inserted into the first base trough 22 from the second base trough 25 and is located under the interlocking unit 42. Apart of the pivot portion 62 that is mounted in the first positioning base 20 is hollow. The interlocking unit 42 selectively abuts the pivot portion 62. The spout cover blocking plate 63 is mounted on and protrudes from the bottom of the pivot portion 62 and extends downward. The pivot portion hole 64 is transversely formed through the pivot portion 62, is aligned with the pin slits 26 and is adjacent to the junction between the pivot portion 62 and the spout cover blocking plate 63. The spout cover pin 66 is inserted through the pivot portion hole 64 and into the pin slits 26, such that the spout cover 60 can be pivoted relative to the first positioning base 20. The torsion spring 65 is mounted around the spout cover pin 66 and abuts between the front block 27 and the pivot portion 62 to provide a recoil force to the spout cover 60. Furthermore, the torsion spring 65 has two abutting ends 651, 652, wherein one of the abutting ends 651 abuts the bottom of the pivot portion 62, and the other abutting end 652 abuts the front block 27.

Figure 4:
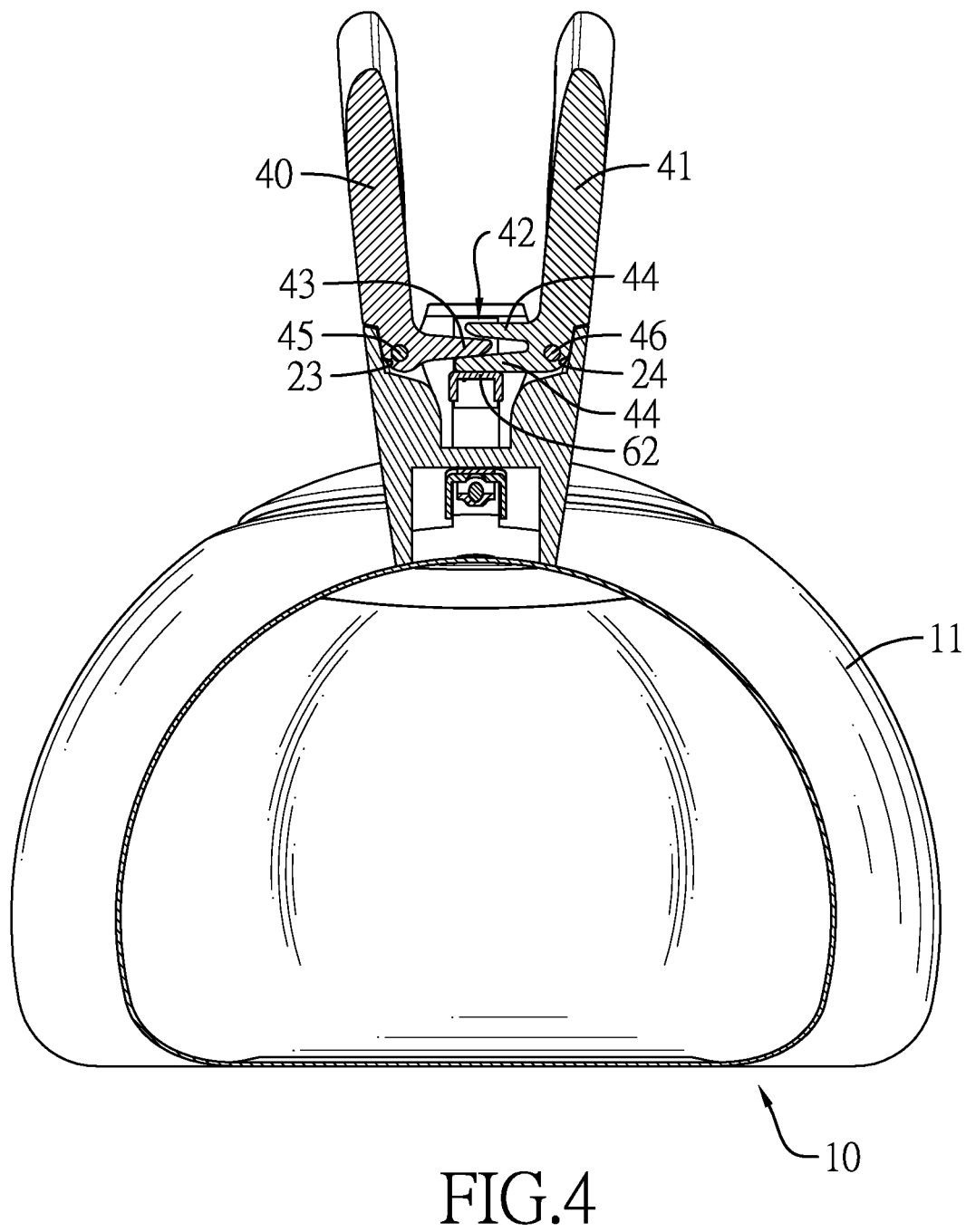
FIG. 4 is a front view in partial section along the line 4-4 in FIG. 3.

With reference to FIGS. 3 and 4, before use, the first handle 40 and the second handle 41 are detached from each other. The abutting end 651 of the torsion spring 65 abuts the pivot portion 62 to push the pivot portion 62 upward, such that the cover body 61 tightly presses the spout 13 downward since the spout cover 60 is pivotable around the spout cover pin 66 and relative to the first positioning base 20.

Figure 5:
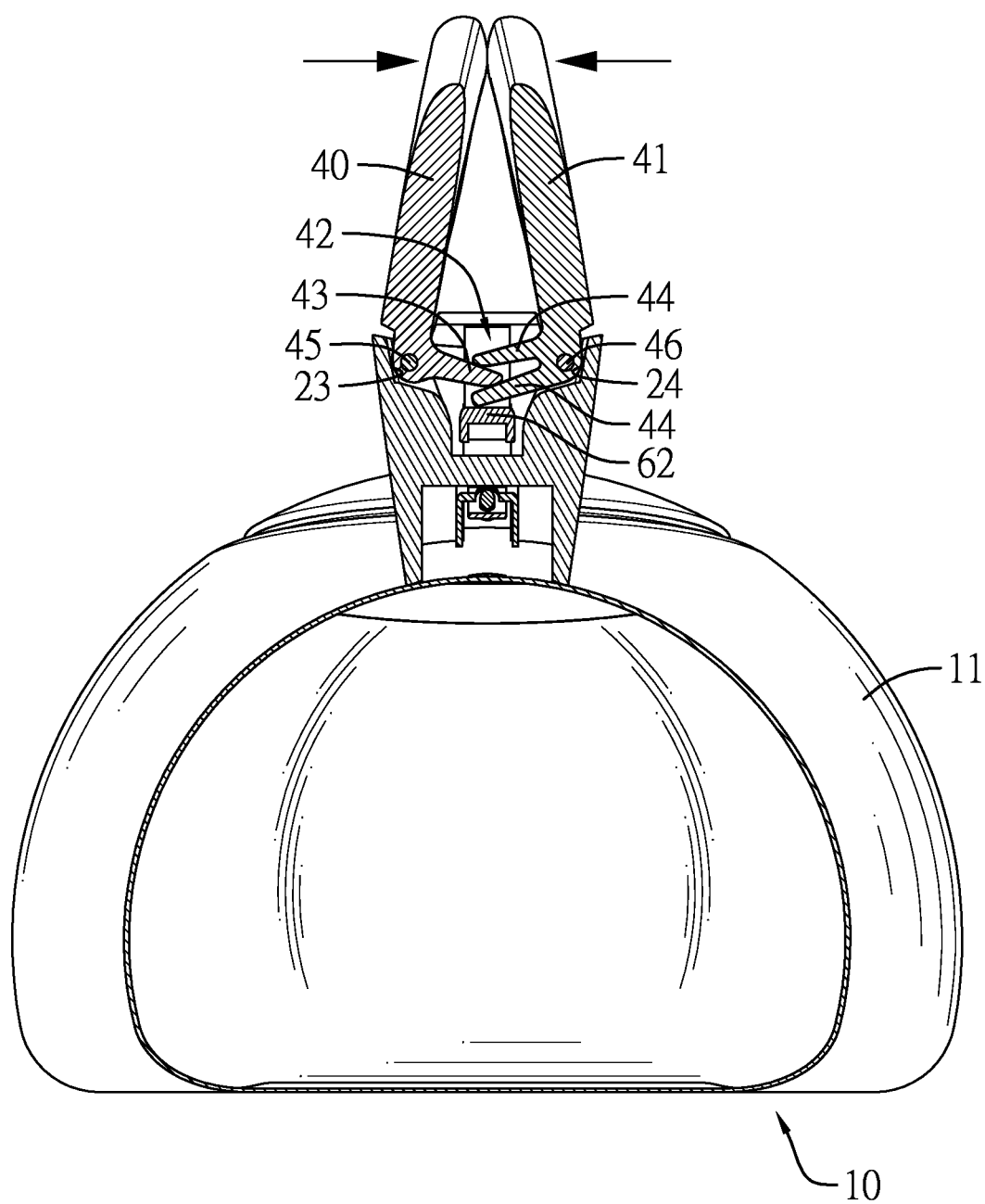
FIG. 5 is an operational front view in partial section of the spout interlocking device in FIG. 1.
Figure 6:
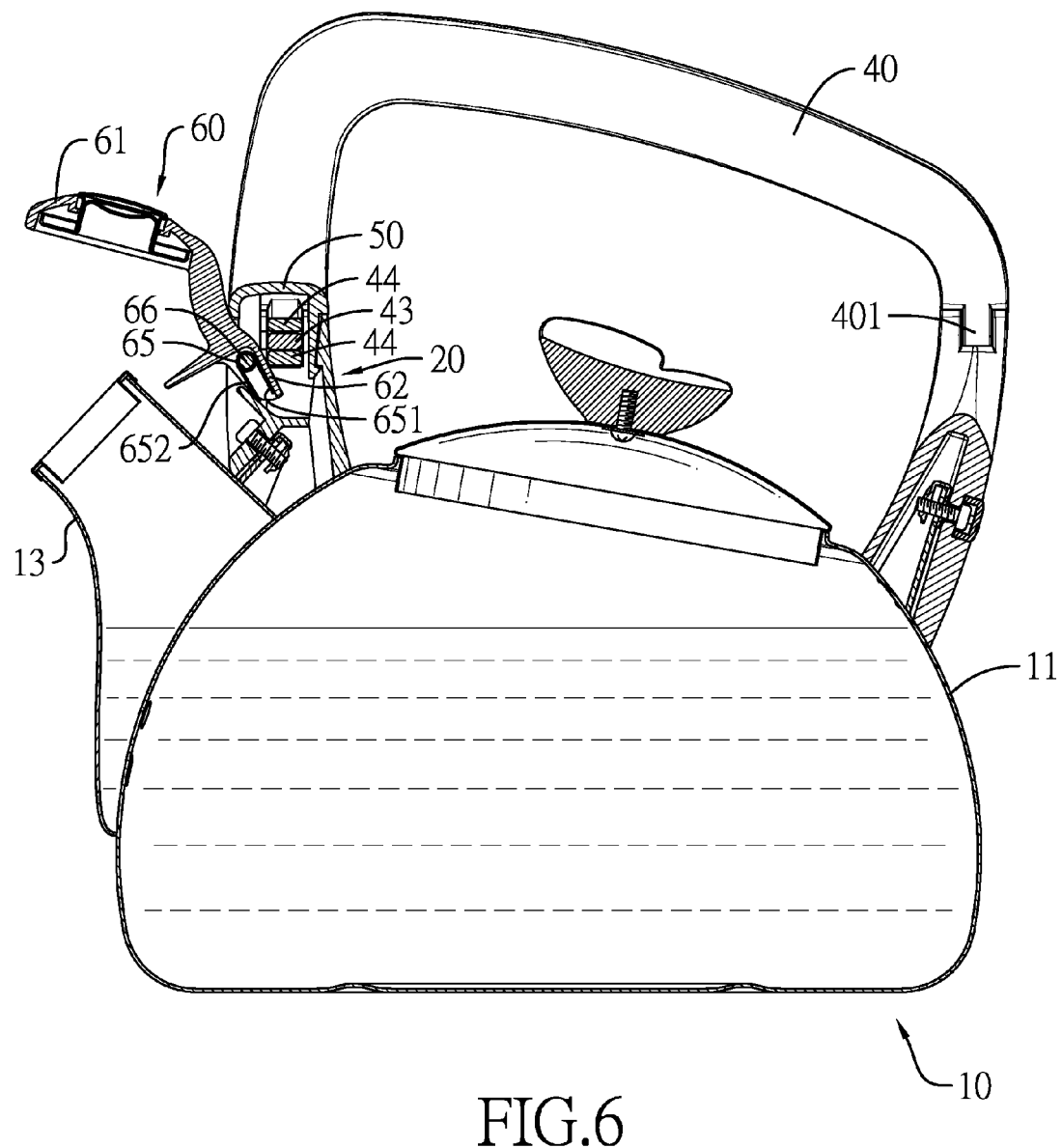
FIG. 6 is an operational side view in partial section of the spout interlocking device in FIG. 1.

With reference to FIGS. 5 and 6, in use, the first handle 40 and the second handle 41 are pressed toward each other by the user, wherein the first handle 40 is pivoted around the front handle pin 45 and the rear handle pin 403 and relative to the first positioning base 20 and the second positioning base 30, and the second handle 41 is pivoted around the front handle pin 46 and the rear handle pin 413 and relative to the first positioning base 20 and the second positioning base 30. In the meantime, both the pushing block 43 and the positioning block 44 are pivoted downward, and the positioning block 44 presses the pivot portion 62 downward. Then, the spout cover 60 is pivoted around the spout cover pin 66, such that the cover body 61 is removed from the spout 13. Therefore, the user can pour the drinks from the teapot 10.

After use, the user loosens the first handle 40 and the second handle 41, such that the spout cover 60 can be pivoted to cover the spout 13 again with the recoil force provided by the torsion spring 65.

Figure 7:
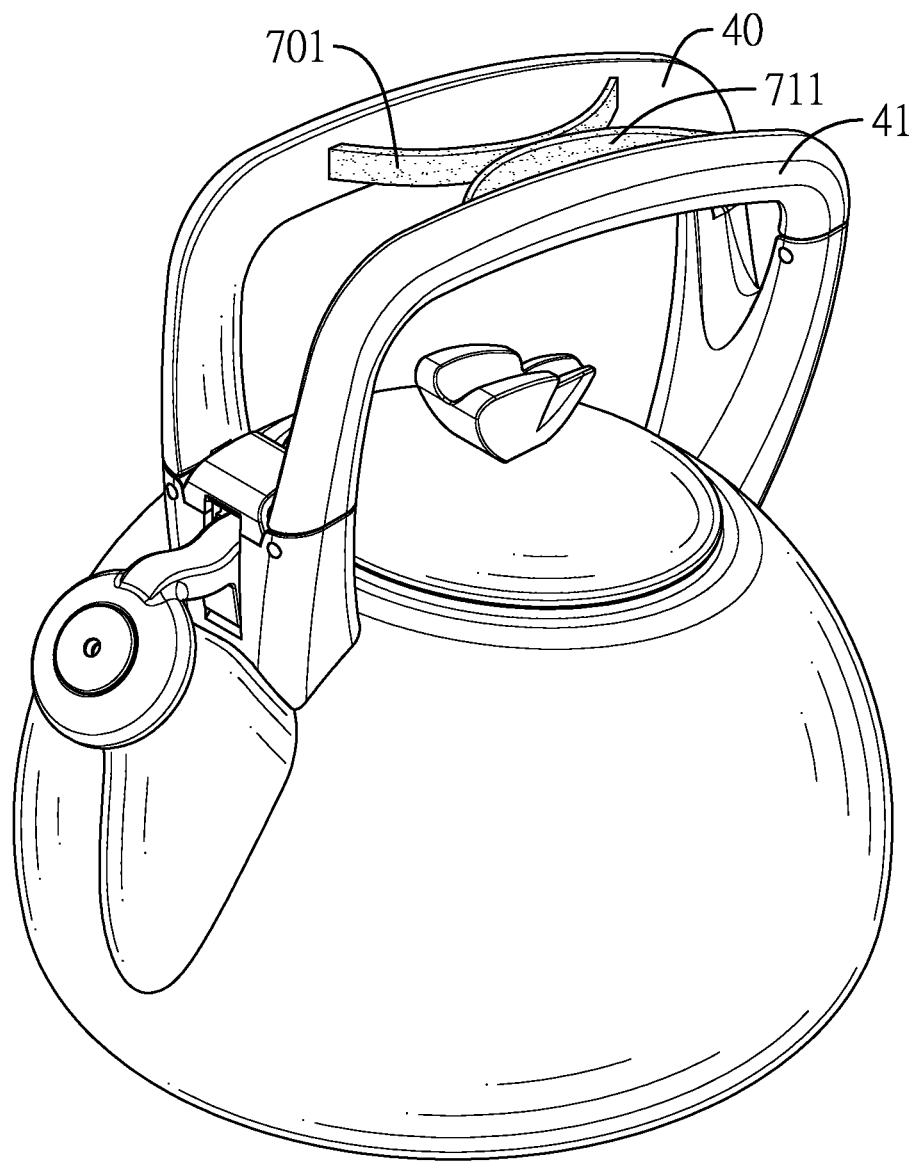
FIG. 7 is a perspective view of a second preferred embodiment of a spout interlocking device of a teapot in accordance with the present invention.

With reference to FIG. 7, a second preferred embodiment of a spout interlocking device of a teapot in accordance with the present invention is similar to the first preferred embodiment and further has two elastic sheets 701, 711. The elastic sheets 701, 711 are mounted on the first handle 40 and the second handle 41 respectively, and face each other. The elastic sheets 701, 711 are elastic, curved, and abut each other. Before use, the elastic sheets 701, 711 abut each other but are not compressed. In use, the first handle 40 and the second handle 41 are pressed toward each other, such that the elastic sheets 701, 711 are compressed by each other. After use, the first handle 40 and the second handle 41 are loosened, such that the elastic sheets 701, 711 provide recoil forces to the first handle 40 and the second handle 41 to reset to the original position relative to the teapot 10.

Therefore, the spout cover 60 can open automatically when the first handle 40 and the second handle 41 are pressed toward each other, such that the drinks in the teapot 10 can be poured out smoothly. The spout cover 60 can close automatically when the first handle 40 and the second handle 41 are loosened to detach from each other. Accordingly, the operation process is easy for the user, and hand injury is effectively prevented.

What is claimed is:

1. A spout interlocking device of a teapot having:
   a first fixing module having
      a first positioning base; and
      a first base cover covering a top of the first positioning base;
   a handle module pivotably mounted on the first positioning base and having
      a first handle being elongated and pivotably connected with the first positioning base;
      a second handle being elongated and pivotably connected with the first positioning base; and
      an interlocking unit mounted on a front end of the first handle and a front end of the second handle, located in and pivotably mounted in the first positioning base, and covered and positioned by the first base cover; and
   a spout cover module mounted on the first positioning base and having a spout cover mounted on the first positioning base and having
      a pivot portion pivotably mounted in the first positioning base, extending opposite to the handle module, located under the interlocking unit, and selectively abutted by the interlocking unit; and
      a cover body connected with the pivot portion at a position opposite to the first positioning base.

2. The spout interlocking device of a teapot as claimed in claim 1, wherein the first positioning base further has
   a first base trough formed through the first positioning base longitudinally and having a base opening formed in the top of the first positioning base; and
   two working troughs formed in an inner wall of the first positioning base, communicating with the first base trough, and aligned with each other, wherein the interlocking unit is pivotably mounted in the working troughs.

3. The spout interlocking device of a teapot as claimed in claim 1, wherein the first positioning base further has
   a first base trough formed through the first positioning base longitudinally and having a base opening formed in the top of the first positioning base; and
   a second base trough formed from a front side of the first positioning base and communicating with the first base trough, wherein the pivot portion is mounted through the second base trough.

4. The spout interlocking device of a teapot as claimed in claim 3, wherein
   the first positioning base further has two pin slits formed in the inner wall of the first positioning base, communicating with the second base trough and aligned with each other;
   a part of the pivot portion that is mounted in the first positioning base is hollow; and
   the spout cover module further has
      a spout cover pin inserted through the pivot portion and into the pin slits; and
      a torsion spring mounted around the spout cover pin and having two abutting ends, wherein one of the abutting ends abuts the first positioning base and the other abutting end abuts a bottom of the pivot portion.

5. The spout interlocking device of a teapot as claimed in claim 2, wherein
   the first positioning base further has
      a second base trough formed from the front side of the first positioning base; and
      two pin slits formed in the inner wall of the first positioning base, communicating with the second base trough and aligned with each other;
   a part of the pivot portion that is mounted in the first positioning base is hollow; and
   the spout cover module further has
      a spout cover pin inserted through the pivot portion and into the pin slits; and
      a torsion spring mounted around the spout cover pin and having two abutting ends, wherein one of the abutting ends abuts the first positioning base and the other abutting end abuts a bottom of the pivot portion.

6. The spout interlocking device of a teapot as claimed in claim 1, wherein
   the first positioning base further has
      a first base trough formed through the first positioning base longitudinally and having a base opening formed in the top of the first positioning base;

a second base trough formed from a front side of the first positioning base and communicating with the first base trough, wherein the pivot portion is mounted through the second base trough;

an engaging trough formed in an inner wall of the first positioning base and at a position opposite to the second base trough; and an engaging edge formed on a top of the engaging trough; and the first base cover further has a top cap covering a base opening of the first base trough; and an engaging hook mounted from a bottom of the top cap and engaged with the engaging edge.

7. The spout interlocking device of a teapot as claimed in claim 1 further comprising two elastic sheets mounted on the first handle and the second handle respectively, and facing and abutting each other.

8. The spout interlocking device of a teapot as claimed in claim 2 further comprising two elastic sheets mounted on the first handle and the second handle respectively, and facing and abutting each other.

9. The spout interlocking device of a teapot as claimed in claim 3 further comprising two elastic sheets mounted on the first handle and the second handle respectively, and facing and abutting each other.

10. The spout interlocking device of a teapot as claimed in claim 1, wherein the interlocking unit has a pushing block and a positioning block;

the pushing block and the positioning block are respectively mounted on the front ends of the first handle and the second handle;

the pushing block is a single tab;

the positioning block is a double tab; and the pushing block is inserted into the positioning block.

11. The spout interlocking device of a teapot as claimed in claim 2, wherein the interlocking unit has a pushing block and a positioning block;

the pushing block and the positioning block are respectively mounted on the front ends of the first handle and the second handle;

the pushing block is a single tab;

the positioning block is a double tab; and the pushing block is inserted into the positioning block.

12. The spout interlocking device of a teapot as claimed in claim 3, wherein the interlocking unit has a pushing block and a positioning block;

the pushing block and the positioning block are respectively mounted on the front ends of the first handle and the second handle;

the pushing block is a single tab;

the positioning block is a double tab; and the pushing block is inserted into the positioning block.

13. The spout interlocking device of a teapot as claimed in claim 4, wherein the interlocking unit has a pushing block and a positioning block;

the pushing block and the positioning block are respectively mounted on the front ends of the first handle and the second handle;

the pushing block is a single tab;

the positioning block is a double tab; and the pushing block is inserted into the positioning block.

14. The spout interlocking device of a teapot as claimed in claim 5, wherein the interlocking unit has a pushing block and a positioning block;

the pushing block and the positioning block are respectively mounted on the front ends of the first handle and the second handle;

the pushing block is a single tab;

the positioning block is a double tab; and the pushing block is inserted into the positioning block.

15. The spout interlocking device of a teapot as claimed in claim 6, wherein the interlocking unit has a pushing block and a positioning block;

the pushing block and the positioning block are respectively mounted on the front ends of the first handle and the second handle;

the pushing block is a single tab;

the positioning block is a double tab; and the pushing block is inserted into the positioning block.

16. The spout interlocking device of a teapot as claimed in claim 7, wherein the interlocking unit has a pushing block and a positioning block;

the pushing block and the positioning block are respectively mounted on the front ends of the first handle and the second handle;

the pushing block is a single tab;

the positioning block is a double tab; and the pushing block is inserted into the positioning block.

17. The spout interlocking device of a teapot as claimed in claim 8, wherein the interlocking unit has a pushing block and a positioning block;

the pushing block and the positioning block are respectively mounted on the front ends of the first handle and the second handle;

the pushing block is a single tab;

the positioning block is a double tab; and the pushing block is inserted into the positioning block.

18. The spout interlocking device of a teapot as claimed in claim 9, wherein the interlocking unit has a pushing block and a positioning block;

the pushing block and the positioning block are respectively mounted on the front ends of the first handle and the second handle;

the pushing block is a single tab;

the positioning block is a double tab; and the pushing block is inserted into the positioning block.

19. The spout interlocking device of a teapot as claimed in claim 1, wherein the spout interlocking device further has a second positioning base having two fixing troughs;

the fixing troughs are formed in an inner wall of the second positioning base and located opposite each other;

a rear end of the first handle and a rear end of the second handle are pivotably mounted in the fixing troughs respectively.

20. The spout interlocking device of a teapot as claimed in claim 2, wherein the spout interlocking device further has a second positioning base having two fixing troughs;

the fixing troughs are formed in an inner wall of the second positioning base and located opposite each other;

a rear end of the first handle and a rear end of the second handle are pivotably mounted in the fixing troughs respectively.

\* \* \* \* \*